United States Patent [19]

Cournet et al.

[11] Patent Number: 4,723,917
[45] Date of Patent: Feb. 9, 1988

[54] DEVICE FOR LOW VOLTAGE ELECTRIC DISTRIBUTION

[75] Inventors: Georges Cournet, Chalon sur Saone; Jean-Pierre Genelot, Saint Marcel; Patrice Gudefin, Chatenoy le Royal, all of France

[73] Assignee: Alsthom, Paris, France

[21] Appl. No.: 758,987

[22] Filed: Jul. 25, 1985

[30] Foreign Application Priority Data

Aug. 7, 1984 [FR] France .............................. 84 12472

[51] Int. Cl.⁴ .............................................. H02G 5/08
[52] U.S. Cl. .................................... 439/212; 174/68 B
[58] Field of Search .............. 339/22 B, 22 R, 191 M, 339/191 R, 198 R, 198 J; 174/68 B, 99 B

[56] References Cited

U.S. PATENT DOCUMENTS

| | | | |
|---|---|---|---|
| 2,720,632 | 10/1955 | Stieglitz | 339/22 B |
| 3,219,887 | 11/1965 | Gerg et al. | 339/22 B |
| 3,884,541 | 5/1975 | O'Nan et al. | 339/22 B |
| 4,157,582 | 6/1979 | Myers | 339/22 B |

FOREIGN PATENT DOCUMENTS

0645185 9/1962 Italy .................................. 339/22 R

Primary Examiner—Gil Weidenfeld
Assistant Examiner—Thomas M. Kline
Attorney, Agent, or Firm—Sughrue, Mion, Zinn, Macpeak and Seas

[57] ABSTRACT

A device for low voltage electric distribution includes a set of bus bars for feeding a plurality of outlets protected by a circuit breaker apparatuses, characterized in that it comprises a molded insulating structure comprising two vertical parallel walls (1, 2) separated by a horizontal transversal partition (3), with metal rails (10, 20, 30, 40) inserted in the transversal partition and opening onto either side of said partition. One side acts as a support for the bus bars (11, 21, 31, 41) and the other forming power connections (12, 22, 32, 42), with the tips of said power connection being arrange in accordance with the generatrices of a cylinder with a vertical axis situated in the symmetry plane of the structure. The structure, on the side of the supplies is divided by horizontal partitions defining sockets, with each socket capable of receiving an insulating component (66) bearing clamps (71, 72). The clamp clamping on one side, one of the power connections and on the other a metallic blade (116) of a terminal of an apparatus to be connected. The blade passes through an opening (67) of said insulating component situated in the middle of said terminal, such that all the electrical connections between the apparatuses and the distribution device are made in accordance with a single insertion line.

4 Claims, 9 Drawing Figures

DEVICE FOR LOW VOLTAGE ELECTRIC DISTRIBUTION

Figure 1:
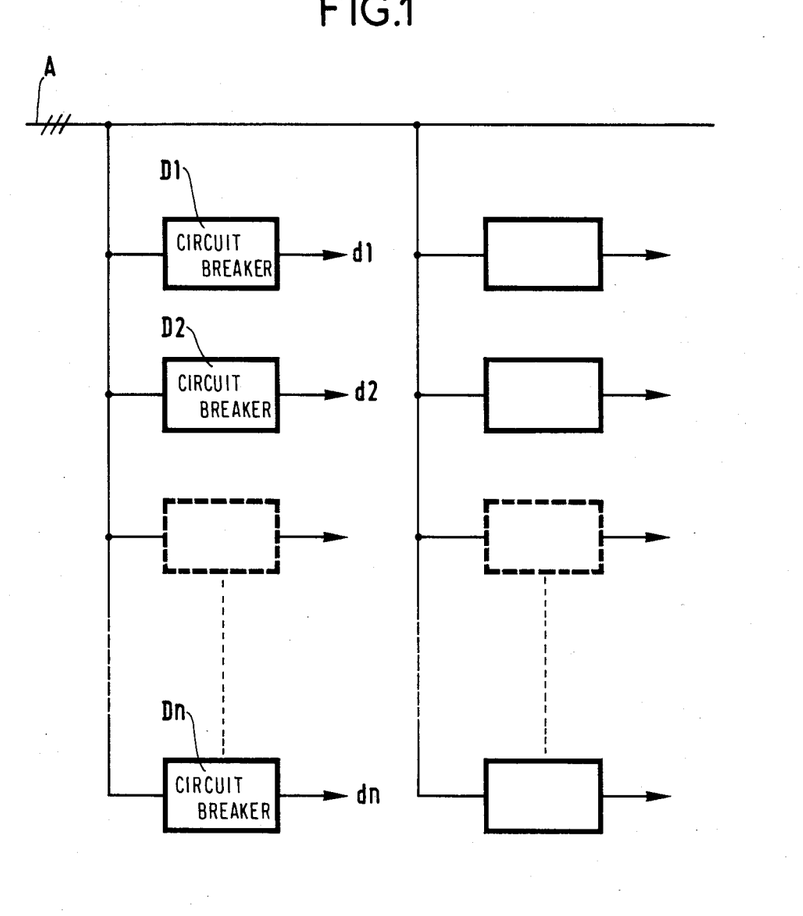
FIG. 1 is an electrical circuit diagram of a low voltage distribution device.

The present invention relates to a device for low voltage electric distribution, of the type shown by way of example in FIG. 1, comprising a current supply A supplying one or several columns comprising n outputs d1, d2, dn through circuit breakers D1, D2, Dn.

Each column comprises 3 phase bars and a neutral bar.

In known devices, the bars are arranged vertically and the circuit breakers have their input terminals arranged horizontally.

As a single device can comprise circuit breakers of several types of gauges and that the spacing of the terminals is different from one type to another, the result is that, in order to connect the circuit breakers to the bars, it is necessary to produce connections of a sometimes complex shape, at a high cost and which are difficult to maintain.

An object of the present invention is to produce a low voltage distribution device at a lower cost, requiring less maintenance, with improved reliability and enabling the use of various types of circuit breakers.

The object of the invention is a low voltage electric distribution device comprising a set of bus bars and a plurality of outlets via respective protective circuit-breaker apparatus, characterized in that it comprises a molded insulating structure comprising two vertical parallel walls separated by a horizontal transverse partition, metal rails passing through the transverse partition and having ends projecting from either side thereof, the metal rails on the one side acting as a support for the bus bars and on the other to constitute power connections, with the tips of said power connections being arranged in accordance with the generatrices of a cylinder with a vertical axis situated in the symmetry plane of the structure, said structure having, on the side of the power connection horizontal recess defining partitions forming sockets, with each socket capable of receiving an insulating component bearing and electrically conductive clamp, one end of the said clamp clamping onto one of said power connections and on the other a metallic blade of a terminal of an apparatus to be connected, said blade passing through one opening of said insulating component situated in the middle of said terminal, such that all of the electrical connections between the apparatuses and the distribution device are made in accordance with a single insertion line and said clamp arcuately adjusted on the blade and aligned between the blade and a tip of a selected one of said power connections.

BRIEF DESCRIPTION OF THE DRAWINGS

The invention will be better understood from the following description of a preferred embodiment of the invention, by reference to the attached drawings in which.

DETAILED DESCRIPTION OF PREFERRED EMBODIMENTS

As is shown in FIGS. 4 to 9, the low voltage distribution device comprises a structure in a molded insulating material comprising two rectangular vertical walls 1, 2 connected by a transversal partition 3, 3'.

Figure 4:
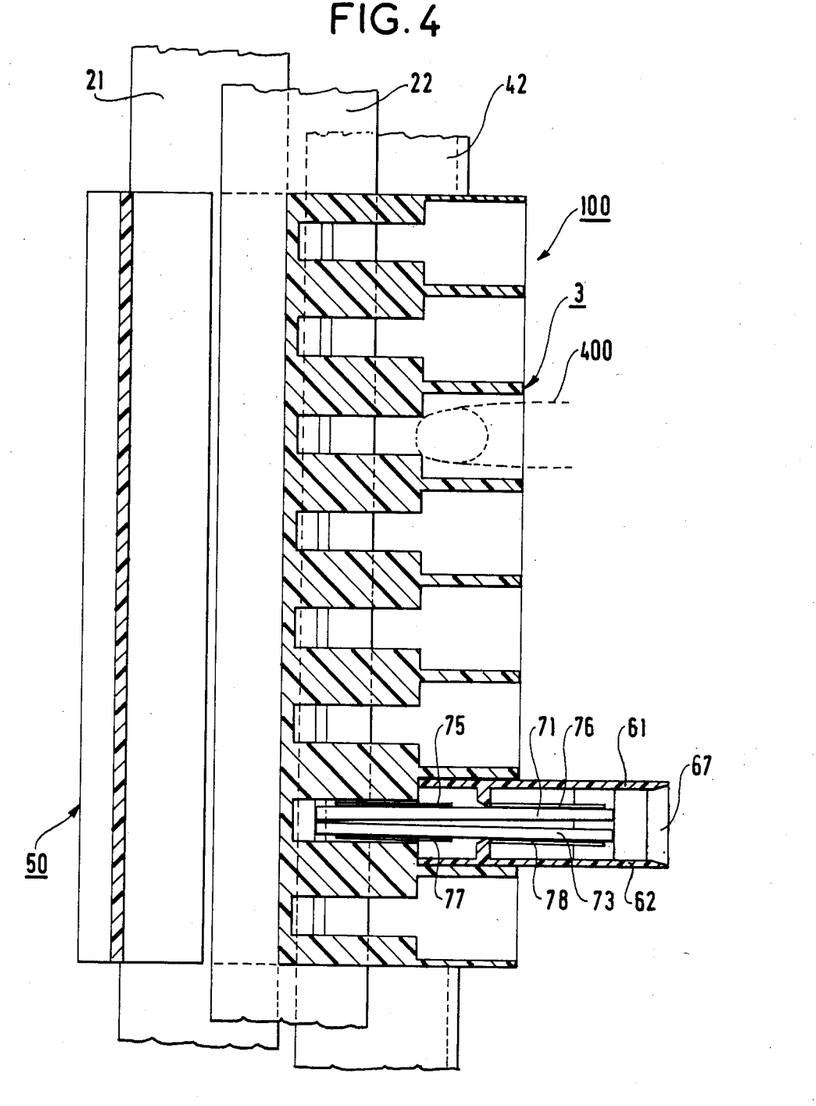
FIG. 4 is a fragmentary view, in cross-section along the line IV—IV of FIG. 2.

Rails 10, 20, 30 and 40 are embedded in the transversal partition, which serve, on one side of partition 3, to support bus bars 11, 21, 31, 41 for current inflow and, on the other side of the partition, they constitute power connections.

The rails are arranged such that the ends of tips 12, 22, 32, 42 of the power connections constitute the generatrices of a cylinder with a vertical axis which is situated in the symmetry plane of the molded structure.

The structure is divided into stages at a standard pitch, separated by a distance equal to the standardized insertion pitch for circuit breakers (the standard pitch 25 mm in France).

These stages are separated by integrally molded horizontal walls. Preferably, structures may be made in eight stage units, which can be superposed.

Figure 2:
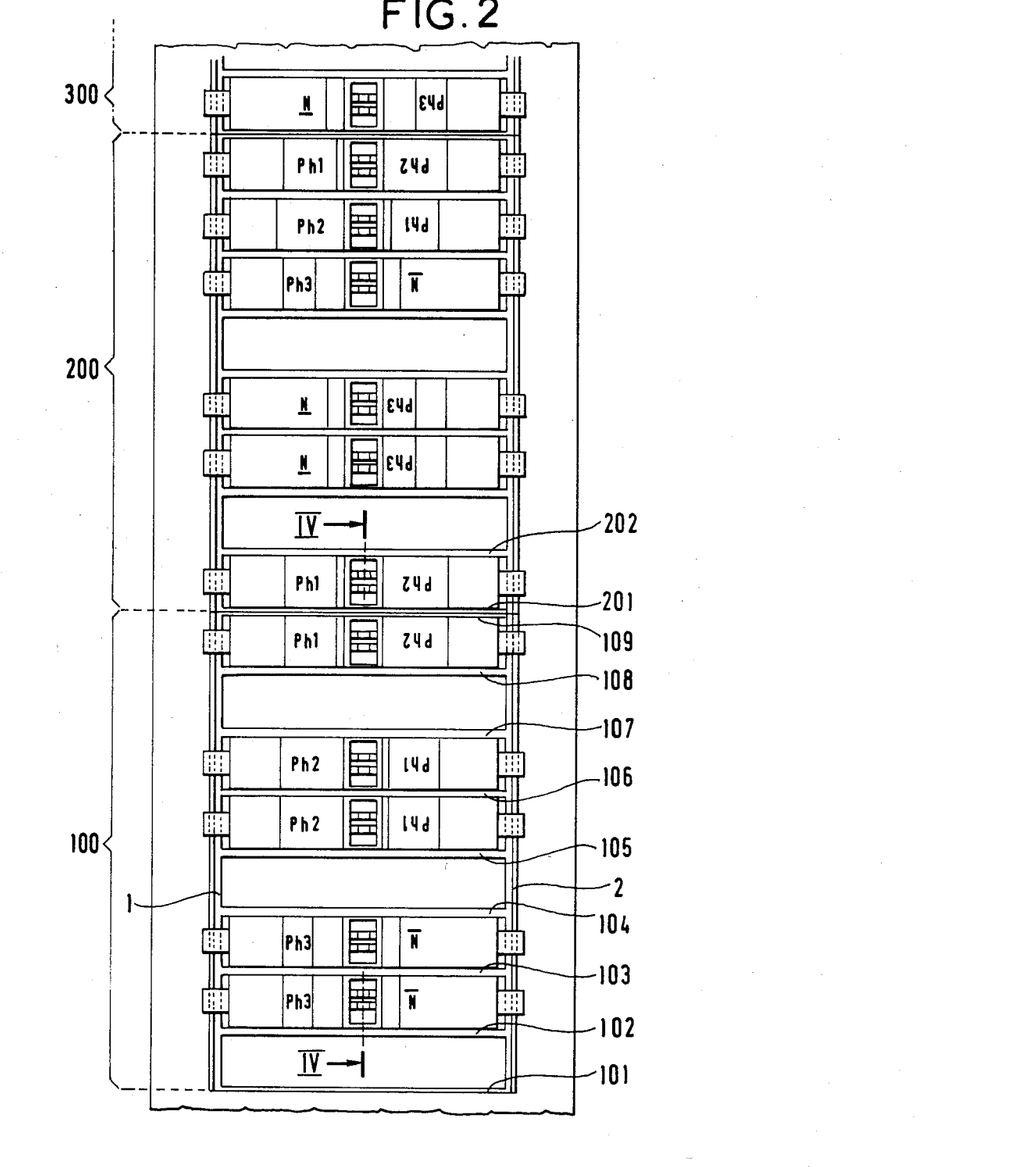
FIG. 2 is a front elevational view of the device according to the invention.

FIG. 2 shows three eight-step structures bearing reference numerals 100, 200 and 300, with the upper structure 300 only being partially shown.

The horizontal partition walls bear reference numerals 101, 102, 103, . . . 109, 201, 202, . . . 209.

The end partition walls 101, 109, 201, 209 are of a thickness which is half of that of the other partition walls, so as to maintain the stages at a constant pitch up a column of stacked structures.

The molded structure therefore comprises a certain number of sockets or recesses on either side of wall partition 3.

Figure 5:
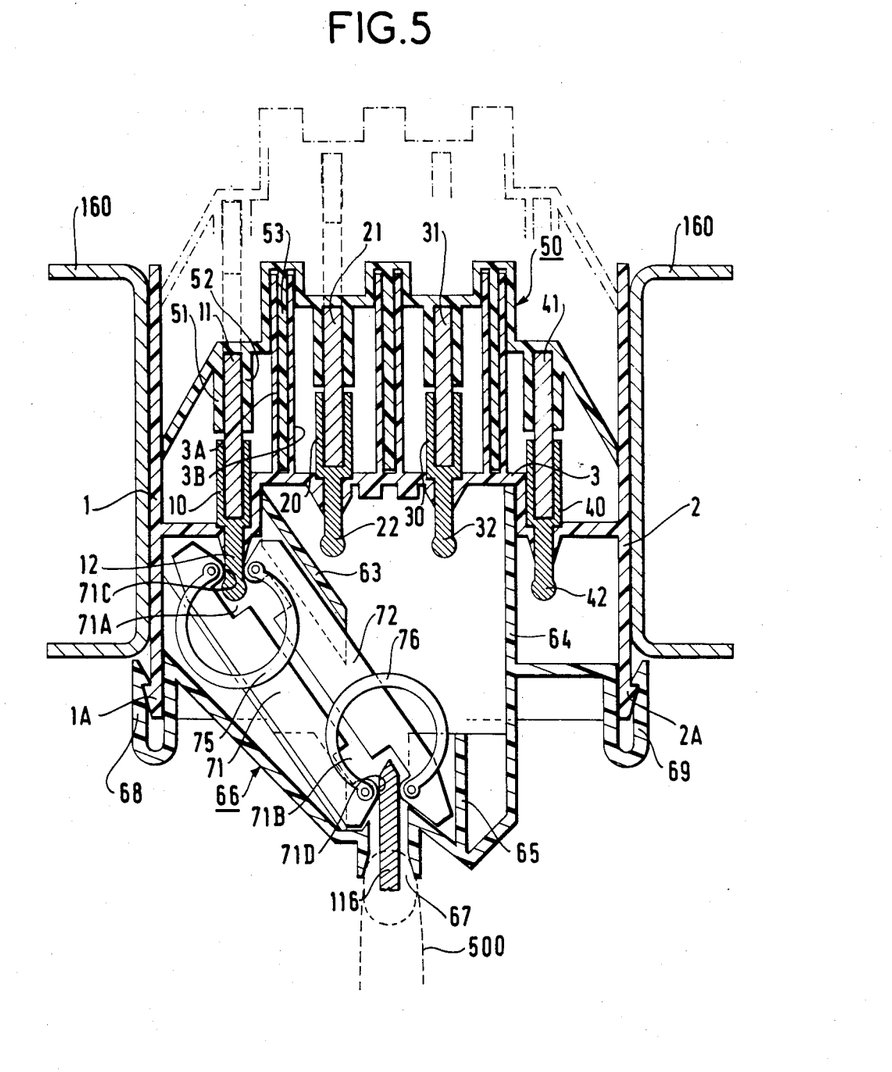
FIGS. 5 to 8 are plan views from above of power connection for the neutral and the three phase supply of the device of FIG. 2.

On the side with the bus bars, the structure is closed by a molded cover 50, FIG. 4, with parallel partitions of two types:

on the one hand partitions grouped in pairs such as 51, 52, FIG. 5 between which a conductor bus bar lies;

on the other hand individual partitions such as 53 which engage between two parallel pairs of partitions such as 3A, 3B which are integrally molded with the structure.

This arrangement provides a rigid structure without necessitating fixing parts.

The cover 50, of course, preferably has the same height as the structure, for example a height corresponding to eight stages.

On the side of the power supply, each socket or recesses is provided with a connector which will be described below.

The connector is of two types, each connector comprises molded insulating component 66 enclosing a metal clamp.

Figure 8:
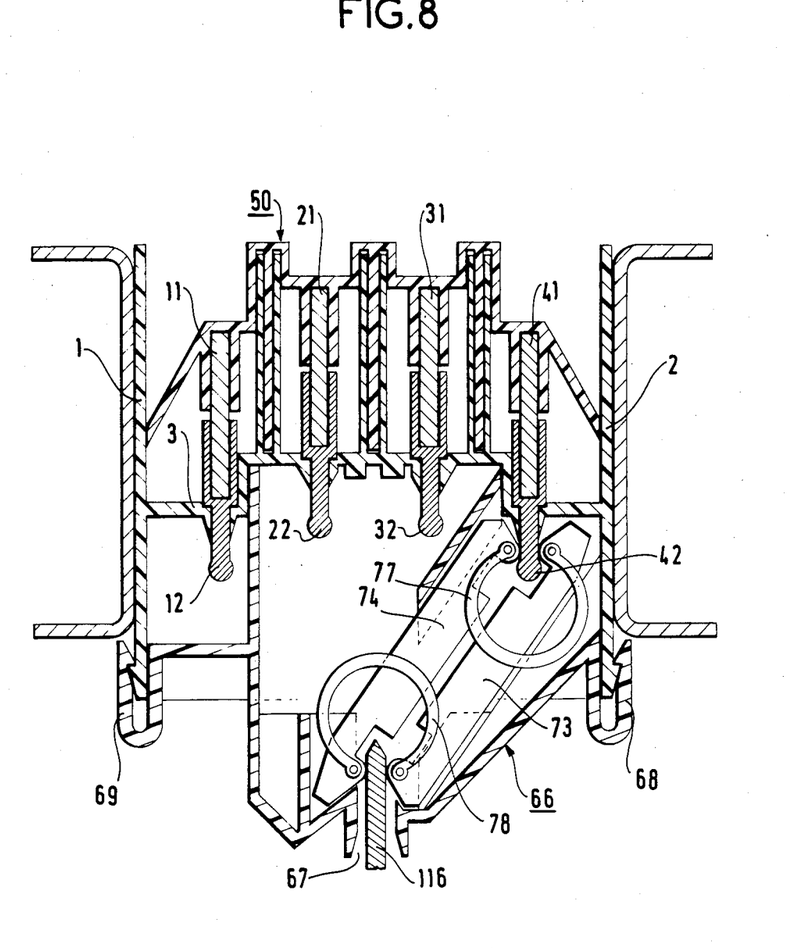

The first type serves to connect the end supplies, that is the power connection 12 (neutral, FIG. 5) and 42 (phase III, FIG. 8). It is sufficient to turn such a connector by 180 degrees to provide either the connection with the far left power connection, or with the far right power connection.

Figure 6:
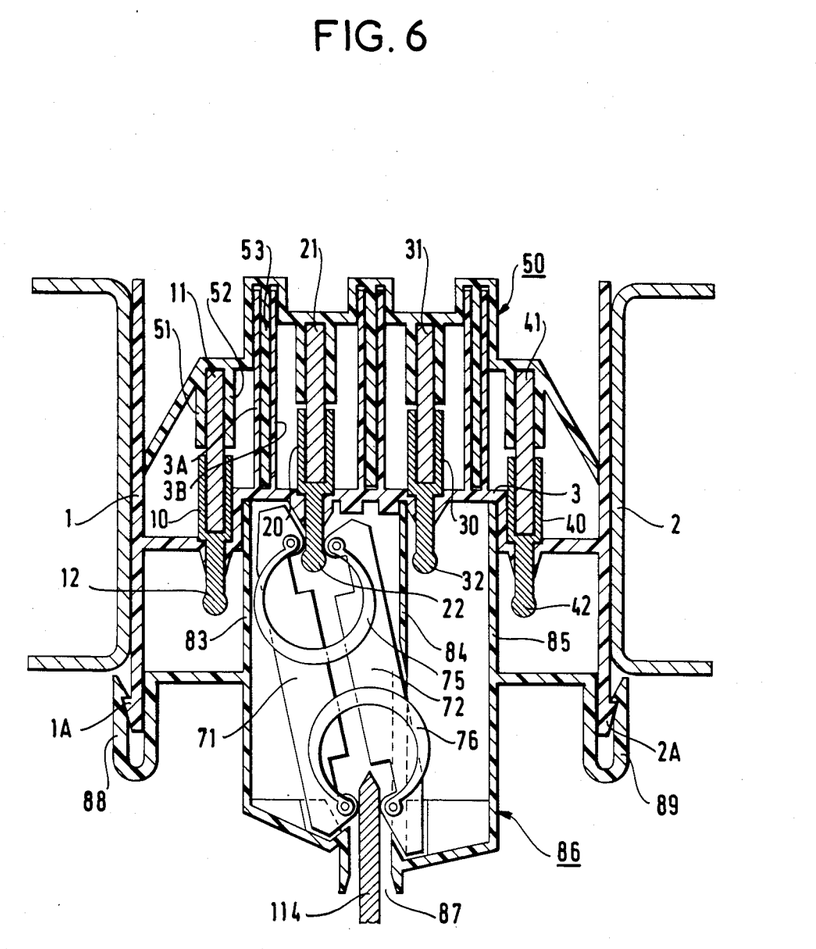
Figure 7:
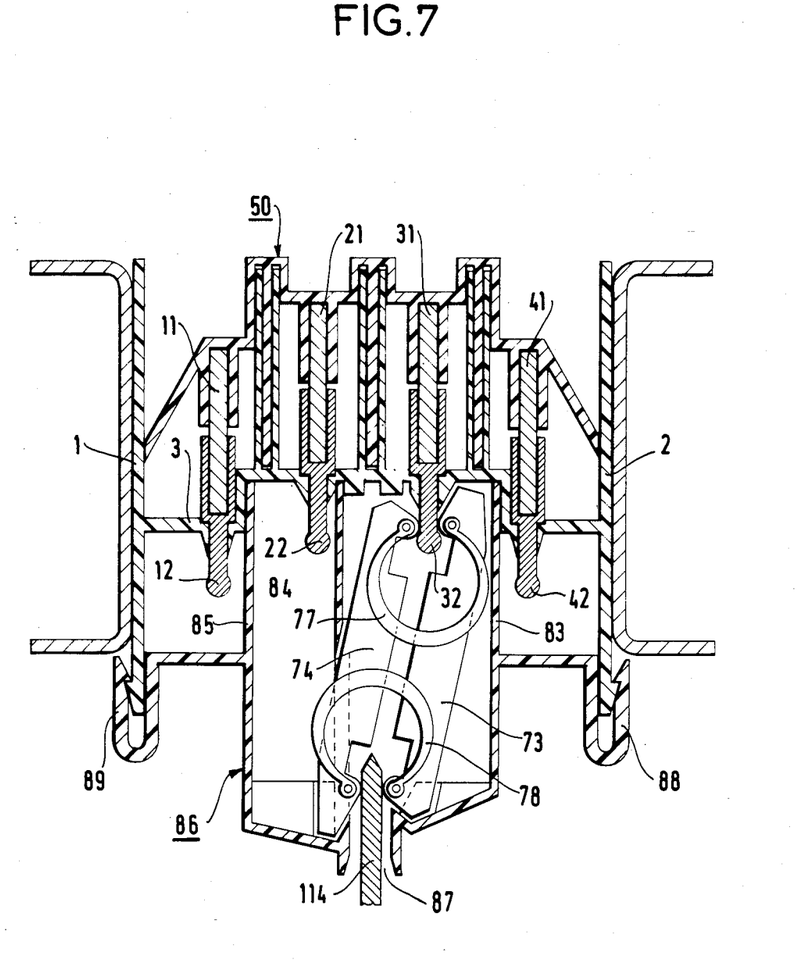

The second type serves to make a connection to one of the central or innermost power connections 22 (phase II, FIG. 6) and 32 (phase II, FIG. 7).

By simply turning (rotating) this connector, the left center power connection the right center power connection is connected.

Referring to FIGS. 4 and 5, it can be seen that a connector of the first type comprises a molded component formed by two parallel plates 61 and 62 connected by perpendicular partitions.

Two partitions, 63 and 64, insulate the available power connections to be connected 12, 42 from the other power connections 22, 32.

Another partition, 65, acts as a support for the metal clamp.

Insulating component, 66 includes a front face for the electrical distributing device and has a central opening 67 for the passage of an input or inlet blade 116 from a circuit breaker to be connected, and two snap fastening clips 68 and 69 cooperating with two pins 1A and 2A of walls 1 and 2 for fixing the connector.

The molded component enclosing the metallic clamps comprising four identical, flat, more or less rectangular parts 71, 72, 73, 74, which face one another in pairs and which are superposed in pairs.

Each part comprises, a long side and facing towards each other, the ends of said part, a notch 71A, 71B and a rounded part 71C, 71D.

The notches receive the power connection 12 or the blade 116, whilst the rounded parts ensure good electrical contact therebetween.

Parts 71 and 72 are interconnected by two resilient metal clips 75 and 76, whilst components 73 and 74 are connected by clips 77 and 78.

The connectors of the second type (FIGS. 6 and 7) are analogous to those of the first type.

They comprise (FIG. 6) two parallel plates with partitions 83, 84, 85 extending therebetween which insulate the useable connection from the other power connection together with a partition 86 acting as a front face and having central opening 87 for the passage of the blade 114 of the apparatus to be connected. They also have clamps 88, 89 for snap fastening to the walls of the molded structure.

The connection clamps in the connections of the second type are identical in shape and size to the clamps previously described.

This advantage results from the arrangement, which is specific to the invention, of the power connection. It can be noted, moreover, that the clamps can be connected to the appropriate bus bars and be carried out in complete safety and security under voltage, which facilitates maintenance.

It can be seen that the device of the invention only comprises a single insertion line, defined by the aligned openings (67, 87) of the clamp-bearing components.

The modularity of the sockets or recesses enables the placing of apparatuses which differ either in type (depending on the manufacturers), or in gauge, or in the number of phases, without requring any connection work.

Thus, FIG. 2 represents an installation with a first circuit breaker (630A per phase) bearing reference numeral 151 at a three pitch with three phases and a neutral and a second circuit breaker 152 (160 or 315A per phase) at one pitch, also with three phases and a neutral.

For each phase and for the neutral of the first circuit breaker, two adjacent sockets are used enabling the introduction of double blades 110-111, 112, 113, 114-115, 116-117.

Between the filled sockets, one socket is left empty.

For the second circuit breaker, 4 filled adjacent sockets are used, for the introduction of single blades.

The indications PhI, PhII, PhIII and N which appear on the front surfaces of the clamp-bearing components, right side up or wrong side up enable it to be immediately known with which bus bar the clamp-bearing component is electrically connected.

It is the legible indication (right side up) which, preferably, supplies this information.

Figure 3:
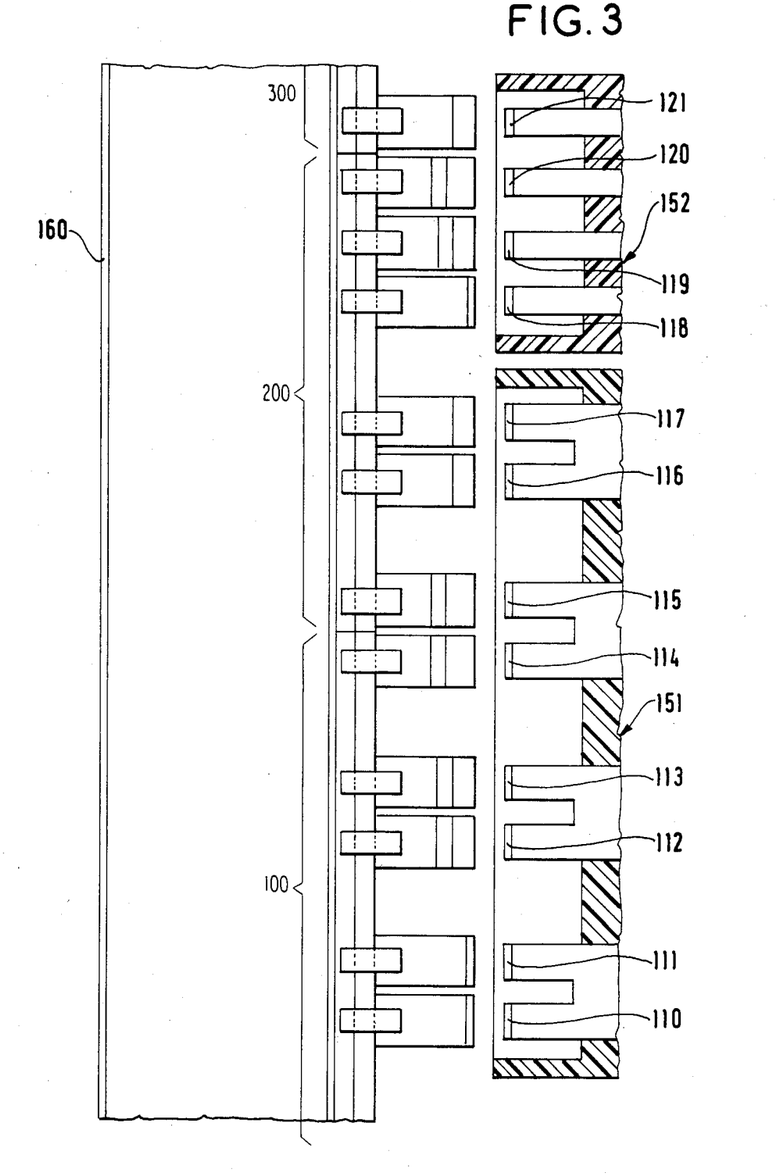
FIG. 3 is a side elevational view of the device according to FIG. 2.

The molded structure can be maintained by an exterior metallic frame 160, which is partially visible in FIGS. 3 and 5.

The width of the bus bars used may vary depending on the power supplied without requiring further modification to the device, as the number of broken lines in FIG. 5 show.

Figure 9:
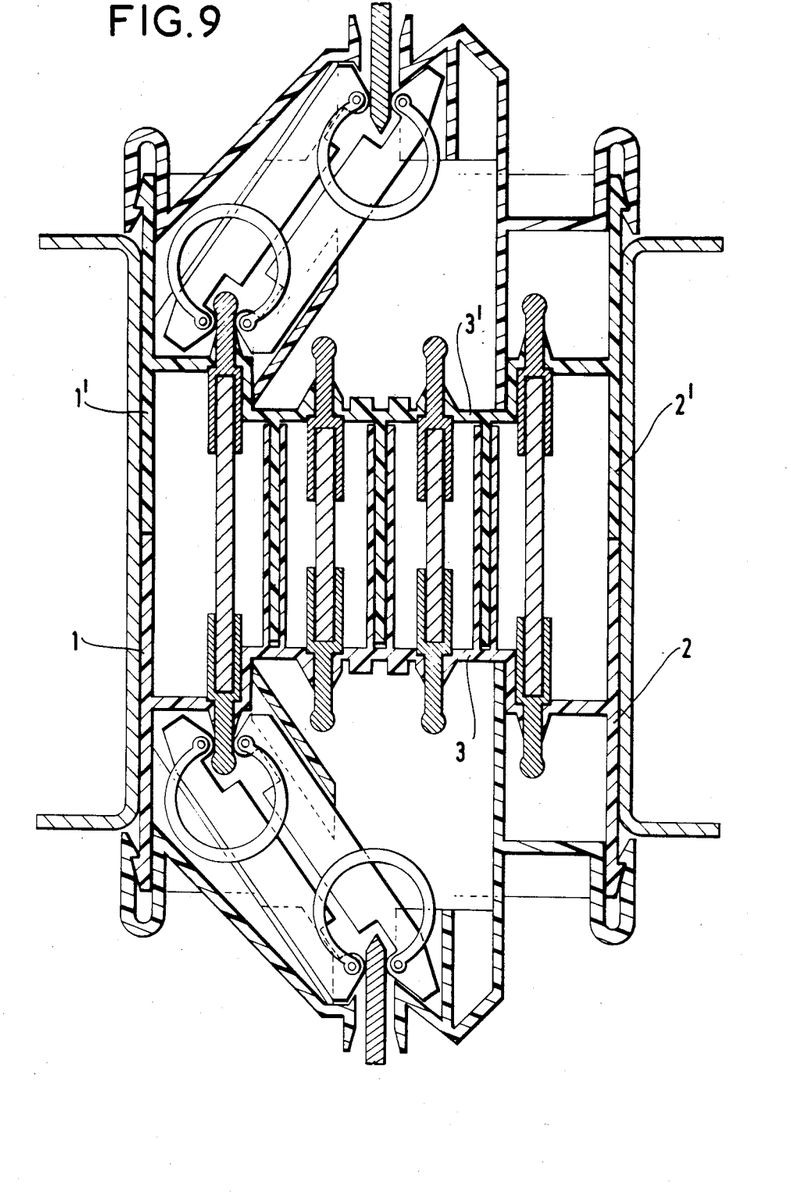
FIG. 9 is a cross section of an alternative embodiment of a distribution device of the present invention.

FIG. 9 shows that the cover 50 can be replaced by a structure 1', 2', 3' which is identical to structure 1, 2, 3 and which uses the same bus bars for connection to another column of apparatuses to be installed.

The distribution device in accordance with the invention offers the possibility of having a large number of connectors per phase, which enables carrying out high gauge start or input shunts (up to approximately 2500A).

Moreover, the distribution device of the invention provides perfect protection for people who cannot have access to components under voltage. It can be seen in FIG. 4 that, even if no connector is inserted, the finger 500 of a user cannot enter into contact with a live power connection 21 or bus bar 22 under voltage.

When the connector is inserted, FIG. 5, the finger 500 of a user cannot come into contact with the clamp 71, 72 under voltage.

What is claimed is:

1. In a device for distributing low voltage electricity including a set of at least four bus bars for feeding a plurality of outlets by respective circuit-breaker apparatuses, said apparatuses to be connected, each having a terminal including a metal input blade (116), the improvement wherein said device comprises a symmetrical molded insulating structure having two parallel vertical walls (1,2) separated by a transverse partition (3), at least four metal rails (10, 20, 30, 40) inserted through the transverse partition (3) and having ends projecting from both sides thereof, the metal rails on one side supporting respective bus bars and on the other side constituting power connections, said rails being positioned such that said metal rail power connections having radially enlarged tips and said rails being positioned such that said tips are respectively disposed along generator lines of a vertical cylinder whose axis is situated in the plane of symmetry of the structure, said insulating structure having a power connection side and a bus bar side, and having horizontal partitions on its power connection side forming recesses, first and second different insulating components (66), means for selectively detachably coupling said insulating components to said molded insulating structure in two oppositely flipped orientations by rotating said insulating component 180° through said plane of symmetry, an electrically conductive clamp (71, 72) positioned within each of said insulating components (66) at one of several oblique angles with respect to said plane of symmetry, said electrically conductive clamp (71, 72) having opposite ends, means for clamping one end of said clamp onto a radially enlarged tip of one of two of said power connections at the same corresponding positions, to opposite sides of said plane of symmetry determined by the oblique angle of said clamp within said power connections, and means for clamping the other end of said clamp onto said metal insert blade (116) of said terminal of said apparatus to be connected, and said blade (116) passing through an opening (67) in the middle of said insulating component (66) with said blade (116) and said opening (67) aligned with the plane of symmetry of said structure, so that all possible electrical connections between the apparatuses and all of said at least four metal rail power connections of the device for distributing low voltage electricity, take place along a single insertion line by selective use of said first and second insulating components and their different clamp angles whereby said clamps engage said blade, and by selective alignment between the blade and the tips, a selected one of all four of said power connections.

2. A device according to claim 1, wherein said insulating component (66) comprises a pair of parallel walls, (61,62), interposed partitions (63, 64, 65) between said parallel walls for insulating said power connections from one another, and said insulating component includes a front face through which said opening (67) passes.

3. A device according to claim 2, characterized in that each clamp comprises four flat parallel metal parts (71, 72, 73, 74) interconnected at opposite ends in two superposed groups by resilient metal clips (75, 76, 77, 78).

4. A device according to claim 1, further comprising a cover (50) closing off said molded insulation structure on its bus bar side, said cover (50) being of insulating material, a plurality of pairs of parallel partitions (51, 52) projecting inwardly from said cover and engaging respectively said bus bars, a plurality of single partitions (53) projecting inwardly from said cover, spaced transversely from said pairs of parallel partitions, and engaged in corresponding pairs of partitions (3A, 3B) integrally molded with the transverse partition (3) and facing outwardly towards said cover.

* * * * *